United States Patent
Bajko et al.

(10) Patent No.: US 9,769,626 B2
(45) Date of Patent: Sep. 19, 2017

(54) FINE TIMING MEASUREMENT POSITIONING AND IMPROVEMENTS IN WIRELESS LOCAL AREA NETWORKS

(71) Applicant: MEDIATEK Singapore Pte. Ltd., Singapore (SG)

(72) Inventors: Gabor Bajko, Santa Clara, CA (US); Chao-Chun Wang, Taipei (TW)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 10 days.

(21) Appl. No.: 14/739,115

(22) Filed: Jun. 15, 2015

(65) Prior Publication Data
US 2015/0365805 A1    Dec. 17, 2015

Related U.S. Application Data (60) Provisional application No. 62/012,517, filed on Jun. 16, 2014.

(51) Int. Cl.
*H04W 4/04*    (2009.01)
*H04W 64/00*   (2009.01)
(Continued)

(52) U.S. Cl.
CPC .............. *H04W 4/043* (2013.01); *G01S 1/70* (2013.01); *G01S 13/767* (2013.01);
(Continued)

(58) Field of Classification Search
CPC ....... H04W 48/12; H04W 84/12; H04W 4/02; H04W 64/00; H04W 64/006;
(Continued)

(56) References Cited

U.S. PATENT DOCUMENTS

| | | | |
|---|---|---|---|
| 2013/0252657 A1 | 9/2013 | Kafle | 455/522 |
| 2013/0336131 A1 | 12/2013 | Zhang et al. | 370/252 |
| 2014/0073352 A1 | 3/2014 | Aldana et al. | 455/456.1 |
| 2014/0112325 A1* | 4/2014 | Calcev | H04W 48/16 370/338 |
| 2014/0160959 A1* | 6/2014 | Aldana | H04L 43/0864 370/252 |
| 2014/0187259 A1* | 7/2014 | Kakani | H04W 64/00 455/456.1 |
| 2014/0355461 A1* | 12/2014 | Aldana | G01S 5/00 370/252 |
| 2014/0355462 A1* | 12/2014 | Aldana | G01S 5/00 370/252 |
| 2015/0063228 A1* | 3/2015 | Aldana | G01S 5/0081 370/329 |

(Continued)

FOREIGN PATENT DOCUMENTS

WO    WO2014063095    4/2014

OTHER PUBLICATIONS

International Search Report and Written Opinion of International Search Authority for PCT/SG2015/050161 dated Sep. 24, 2015 (10 pages).

*Primary Examiner* — Lester Kincaid
*Assistant Examiner* — Gary Lafontant
(74) *Attorney, Agent, or Firm* — Imperium Patent Works; Zheng Jin (57) ABSTRACT

A method of indoor positioning using Fine Timing Measurement (FTM) avoiding co-located access point (AP) is proposed. In a wireless local area network, an AP obtains neighboring AP location information and determines a list of co-located BSSIDs. In a first option, an STA first selects an AP and query for AP location and co-located BSSID information using ANQP (Access Network Query Protocol). In a second option, the STA first selects an AP and initiates FTM protocol with the selected AP and thereby obtaining AP location and co-located BSSID information. Upon obtaining the AP location and the co-located BSSID list, the STA can initiates FTM protocol with additional non-co-located BSSs for determining an accurate STA location.

20 Claims, 5 Drawing Sheets

(51) Int. Cl.
   *G01S 1/70*   (2006.01)
   *G01S 13/76*  (2006.01)
   *G01S 13/87*  (2006.01)
   *H04W 84/12*  (2009.01)

(52) U.S. Cl.
   CPC ......... *G01S 13/878* (2013.01); *H04W 64/006* (2013.01); *H04W 84/12* (2013.01)

(58) Field of Classification Search
   CPC ..... H04W 24/10; H04W 4/023; H04W 4/043; H04W 4/08; H04W 64/003; G01S 5/06; G01S 13/767; G01S 13/878; G01S 13/876; G01S 1/70; G01S 5/00
   USPC ............................................ 455/456.1, 456.2
   See application file for complete search history.

(56) References Cited

U.S. PATENT DOCUMENTS

| | | | | |
|---|---|---|---|---|
| 2015/0257120 A1* | 9/2015 | Prechner | ............. | H04W 64/003 455/456.1 |
| 2015/0264530 A1* | 9/2015 | Prechner | ............... | H04W 4/025 455/456.2 |
| 2015/0341892 A1* | 11/2015 | Aldana | ................. | H04W 64/00 455/456.2 |

* cited by examiner

| CATEGORY | PUBLIC ACTION | TRIGGER | LCI MEASUREMENT REQUEST (OPTIONAL) | LOCATION CIVIC MEASUREMENT REQUEST (OPTIONAL) | FINE TIMING MEASUREMENT PARAMETER (OPTIONAL) |

| CATEGORY | PUBLIC ACTION | DIALOG TOKEN | FOLLOW UP DIALOG TOKEN | TOD | TOA |

510

| TOD ERROR | TOA ERROR | LCI REPORT (OPTIONAL) | LOCATION CIVIC REPORT (OPTIONAL) | FINE TIMING MEASUREMENT PARAMETER (OPTIONAL) |

FINE TIMING MEASUREMENT POSITIONING AND IMPROVEMENTS IN WIRELESS LOCAL AREA NETWORKS

CROSS REFERENCE TO RELATED APPLICATIONS

This application claims priority under 35 U.S.C. §119 from U.S. Provisional Application No. 62/012,517, entitled "Avoid FTM with Co-Located BSSs," filed on Jun. 16, 2014, the subject matter of which is incorporated herein by reference.

TECHNICAL FIELD

The disclosed embodiments relate generally to wireless network communications, and, more particularly, to Fine Timing Measurement (FTM) positioning and improvements in wireless local area networks.

BACKGROUND

IEEE 802.11 is a set of media access control (MAC) and physical layer (PHY) specification for implementing wireless local area network (WLAN) communication, called Wi-Fi, in the unlicensed (2.4, 3.6, 5, and 60 GHz) frequency bands. The standards and amendments provide the basis for wireless network products using the Wi-Fi frequency bands. Wi-Fi plays an important role in the growing application of Indoor Location. The key applicable Wi-Fi technology is that of ranging using time-of-flight (TOF) ranging measurements defined in IEEE 802.11v. Once the distance between devices is measured, the information can be used to determine device location.

In IEEE 802.11-REVmc, Fine Timing Measurement (FTM) protocol is proposed for Indoor Location. Based on FTM, an initiating station (STA) exchanges FTM frames with a responding station (STA) to measure the time-of-flight (TOF) or the Round Trip Delay (RTD/2). The initiating station then computes its range to the responding station after receiving timing measurements (i.e., timestamps corresponding to the departure time and arrival time of the FTM frames) from the responding station. To calculate a station position, the STA performs ranging measurements with multiple access points (APs) via FTM frame exchange and obtains AP's positions. FTM positioning requires the initiating station to exchange FTM frames with multiple responding APs for TOF measurements in order to determine its absolute location. For 3D positioning, the station needs to exchange FTM frames with four APs in order to determine its absolute location.

As well known in the teaching of navigation science, the STA positioning error, obtained from processing the timing measurements, is related to the geometry of the AP positions. This is typically describes by a parameter called PDOP (Position of Dilation). The PDOP is inversely proportional to the volume of tetrahedron formed by unit directional vectors between AP and STA positions. To achieve low positioning error, it is necessary that APs be deployed at strategically selected positions within a coverage area. Specifically, co-located basic service sets (BSSs) (e.g., BBSs on the same physical device or BSSs configured with the same location as a neighboring BSS) should not be used for FTM positioning. STA should know which BSSs are co-located to avoid initiating FTM with those APs managing the co-located BSSs. Configuring APs that share the same location with an mBSSID or LocationID element may not always be feasible. First, it requires an admin to manually configure these elements in the beacons of co-located BSSs. Second, it hardly works in a public environment with APs independently operated by different business entities. A solution for avoiding FTM with co-located BSSs is sought.

SUMMARY

A method of indoor positioning using Fine Timing Measurement (FTM) avoiding co-located access point (AP) is proposed. In a wireless local area network, an AP obtains neighboring AP location information and determines a list of co-located BSSIDs. In a first option, an STA first selects an AP and query for AP location and co-located BSSID information using ANQP (Access Network Query Protocol). In a second option, the STA first selects an AP and initiates FTM protocol with the selected AP and thereby obtaining AP location and co-located BSSID information. Upon obtaining the AP location and the co-located BSSID list, the STA can initiates FTM protocol with additional non-co-located BSSs for determining an accurate STA position.

In one embodiment, a station selects a first access point (AP) for performing fine timing measurement (FTM) positioning in an indoor wireless local area network. The station obtains a list of co-located basic service set IDs (BSSIDs) of the first AP. The station exchanges FTM frames with the first AP. The station exchanges FTM frames with a plurality of APs that are configured with BSSIDs excluded from the list of co-located BSSIDs. In one embodiment, the station obtains the list of co-located BSSIDs of the first AP via Access Network Query Protocol (ANQP). In another embodiment, the station obtains the list of co-located BSSIDs via the FTM frame exchange with the first AP. For example, the station explicitly requests for the list of co-located BSSIDs in an FTM request frame when initiating the FTM positioning.

In another embodiment, an access point (AP) receives location information of neighboring APs in a wireless local area network. The AP determines a list of co-located basic service set IDs (BSSIDs) of the AP based on the location information. The AP transmits the list of co-located BSSIDs to a station for performing fine timing measurement (FTM) positioning. The AP exchanges FTM frames with the station. The AP receives neighboring APs location by exchanging Neighbor Report (NR) elements, or by querying each other for location using ANQP, or by requesting an FTM action frame with location from the other APs. Two BSSs are co-located under FTM purpose if they are configured on the same physical device, are configured with the same location as neighboring BSSs, or are geographically close to each other substantially.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
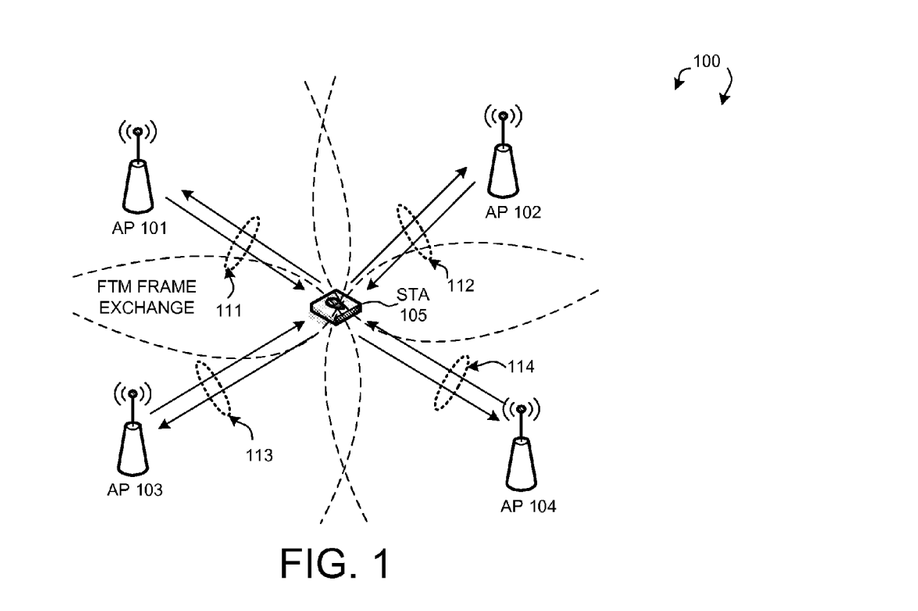
FIG. 1 illustrates a wireless local area network supporting FTM protocol avoiding co-located BSSs in accordance with one novel aspect.

FIG. 1 illustrates a wireless communication system 100 supporting FTM protocol avoiding co-located BSSs in accordance with one novel aspect. Wireless communication system 100 comprises a plurality of access points (APs) AP 101 to AP 104 and a non-AP station STA 105. In FIG. 1, AP 101 to AP 104 are used to provide positioning service for STA 105 in an indoor environment via Fine Timing Measurement (FTM) protocol. Under the FTM protocol, an initiating station exchanges FTM frames with a responding station to measure the time-of-flight (TOF) or the Round Trip Delay (RTD/2). The initiating station then computes its range to the responding station. Based on the location of the responding station, the initiating station is then able to determine its own location.

The STA positioning error, obtained from processing the timing measurements, is related to the geometry of the AP positions. To achieve low positioning error, it is necessary that APs be deployed at strategically selected positions within a coverage area. Specifically, co-located basic service sets (BSSs) (e.g., BBSs on the same physical device or BSSs configured with the same location as a neighboring BSS) should not be used for FTM positioning. STA should know which BSSs are co-located to avoid initiating FTM with those APs managing the co-located BSSs. However, configuring APs that share the same location with an mBSSID or LocationID element may not always be feasible. It requires manual configuration of these elements in the beacons of co-located BSSs. Further, it hardly works in a public environment with APs independently operated by different business entities.

In accordance with one novel aspect, AP can let STAs know which BSS are co-located such that STAs can avoid performing FTM positioning using co-located BSSs. Each BSS is uniquely identified by a basic service set ID (BSSID). For a BSS operating in infrastructure mode, the BSSID is the MAC address of the wireless access point (WAP) generated by combining the 24 bit Organization Unique Identifier (the manufacture's identity) and the manufacturer's assigned 24-bit identifier for the radio chipset in the WAP. The BSSID is the formal name of the BSS and is always associated with only one BSS. In a first option, an STA first selects an AP and query it for AP location and co-located BSSID information using ANQP (Access Network Query Protocol). In a second option, the STA first selects an AP and initiates FTM protocol with the selected AP and thereby obtaining AP location and co-located BSSID information. Upon obtaining the AP location and the co-located BSSID information, the STA can initiates FTM protocol with non-co-located BSSs for determining an accurate STA location.

In the example of FIG. 1, for 3D positioning, STA 105 needs to exchange FTM frames with four non-co-located BSSs in order to determine its absolute location. In the first option, STA 105 first selects AP 101 and obtains AP location and co-located BSSID list using ANQP. STA 105 can then initiate FTM protocol with four non-co-located BSSs (e.g., managed by AP 101, 102, 103, and 104) for FTM positioning. In the second option, STA 105 first selects AP 101 and initiates FTM with AP 101 and obtains AP location and co-located BSSID list via the FTM frame exchange 111. STA 105 then initiates FTM with three other non-co-located BSSs (e.g., managed by AP 102, 103, and 104) to complete the FTM positioning.

Figure 2:
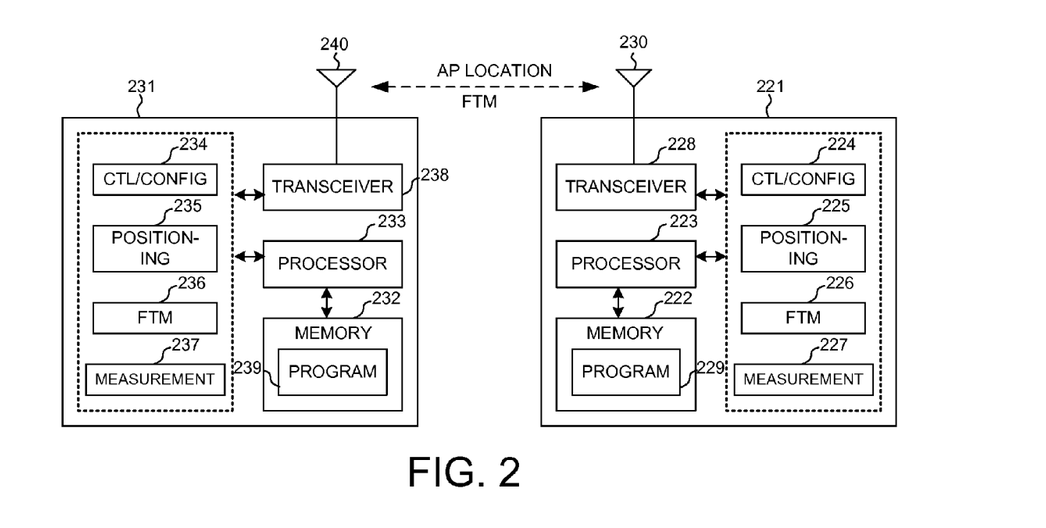
FIG. 2 is a simplified block diagram of a wireless station and an access point supporting certain embodiments of the present invention.

FIG. 2 is a simplified block diagram of an initiating wireless station 221 and a responding wireless station 231 in accordance with one novel aspect. The initiating device is referred to as an initiator, and the responding device is referred to as a responder. Both devices can be an AP station or a non-AP station. Initiating device 221 comprises memory 222, a processor 223, a control and configuration module 224, a positioning module 225, an FTM module 226, and a measurement module 227, and a transceiver 228 coupled to antenna 230. Similarly, responding device 231 comprises memory 232, a processor 233, a control and configuration module 234, a positioning module 235, an FTM module 236, a measurement module 237, and a transceiver 238 coupled to antenna 240. In the transmitting direction, the transceiver converts received baseband signals from the processor to RF signals and sends out to the antenna. In the receiving direction, the processor processes the received baseband signals from the transceiver and invoke different functional modules to perform various features and embodiments supported by the wireless devices.

The different modules are functional modules that can be implemented and configured in software, firmware, hardware, or any combination thereof. The function modules, when executed by processors 223 and 233 (via program instructions 229 and 239 contained in memory 222 and 232), interwork with each other to allow the wireless devices to perform enhanced channel access. For example, the measurement module performs FTM measurement frame timing measurements. The FTM related timing measurements are the departure time of a specific reference point at the transmit frame and the arrival of time of a specific reference point at the receive frame. The FTM module establishes the FTM procedure involving setup phase, measurement phase, and tear down phase. The positioning module determines the absolute location of the wireless device based on the FTM measurement result. The control and configuration module configures FTM related parameters and controls the FTM procedure. In one example, the control and configuration module obtains AP location information and co-located BSSID list such that the FTM positioning procedure is performed without using APs managing co-located BSSs.

Figure 3:
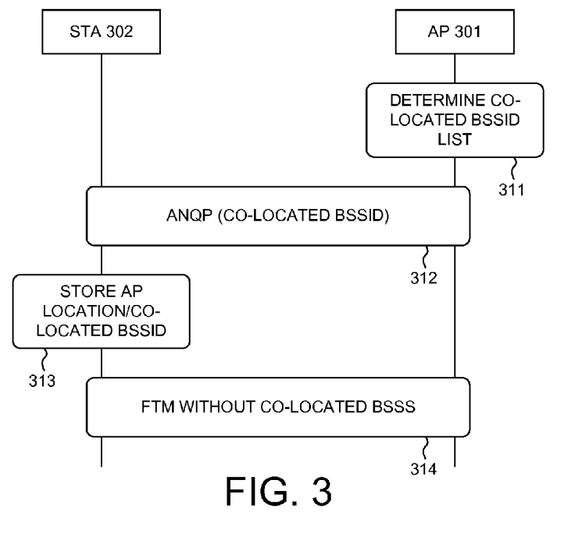
FIG. 3 illustrates one embodiment of sending co-located BSSIDs from an AP to STAs before FTM.

FIG. 3 illustrates one embodiment of sending co-located BSSIDs from an AP to STAs using ANQP before FTM. In step 311, AP 301 determines a list co-located BSSIDs. In general, neighboring APs can learn about each other's location by exchanging Neighbor Report (NR) elements, or by querying each other for location using ANQP, or by requesting an FTM action frame with location from the other APs. Based on the received location information, AP 301 examines the location of its neighbors and decide whether they are co-located or not. If multiple BSSs are configured on the same physical device, then the BSSs are considered co-located. If multiple BSSs are configured with the same location as a neighboring BSS, then the BSSs are also considered co-located. For example, APs in the same conference room, APs near the same gate at an airport, APs in the same sector of a shopping mall, etc. can have the same civic address. Those APs are considered co-located for FTM purpose. Further, if APs are physically close to each other having substantially the same geographic location (e.g., GPS coordinates), then those APs are also considered co-located for FTM purpose. AP 301 then builds a list of co-located BSSIDs by adding the BSSID of the neighboring APs that are considered co-located to the co-located BSSID list.

In step 312, STA 302 queries AP 301 for location information via ANQP. As a result, STA 302 obtains AP location information with a list of co-located BSSIDs. The co-located BSSID list can be carried with the location of the AP within the location ANQP element. In step 313, STA 302 stores the AP location and co-located BSSID list since they do not change very frequently. Later, in step 314, STA 302 initiates an FTM positioning procedure with AP 301 as well as additional non-co-located BSSs to determine its location information.

In addition to ANQP, the FTM protocol itself can be used for STA to obtain AP location and co-located BSSID information. For example, an STA can initiate FTM by sending an FTM request to an AP, which can have one bit set by the STA to request the list of BSSIDs. In response, the AP will send an FTM frame containing the list of BSSIDs back to the STA.

Figure 4:
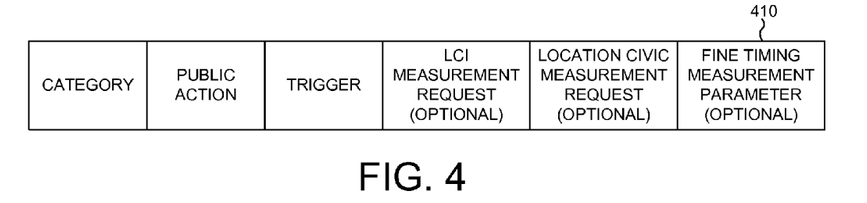
FIG. 4 is an example of a FTM request with indication requesting co-located BSSIDs.

FIG. 4 is an example of a FTM request with indication requesting co-located BSSIDs. As depicted by FIG. 4, FTM request frame 410 comprises a 1-octet Category field, a 1-octet Public Action field, a 1-octet Trigger field, an optional LCI measurement request, an optional Location Civic Measurement Request field, and an optional FTM Parameter field. The category field is set to the value for Public. The Public Action filed is set to indicate a FTM request frame. The Trigger field set to "1" indicates that the initiating STA requests that the responding STA start or continue sending FTM measurement frames. The Trigger field set to "0" indicates that the initiating STA requests that the responding STA stop sending FTM measurement frames. The LCI Measurement Request field, if present, contains a Measurement Request element with Measurement Type equal to LCI request, which indicates a request for a Measurement Report element with Measurement Type equal to LCI. The Location Civic Measurement Request field, if present, contains a Measurement Request element with Measurement Type equal to Location Civic Request, which indicates a request for Measurement Report element with Measurement Type equal to Location Civic report. The FTM Parameter field is present in the initial FTM Request frame, and is not present in subsequent FTM Request trigger frames. If present, it contains a FTM parameter element. In one example, a one-bit indication requesting the list of co-located BSSID list can be added in the FTM parameter element.

Figure 5:
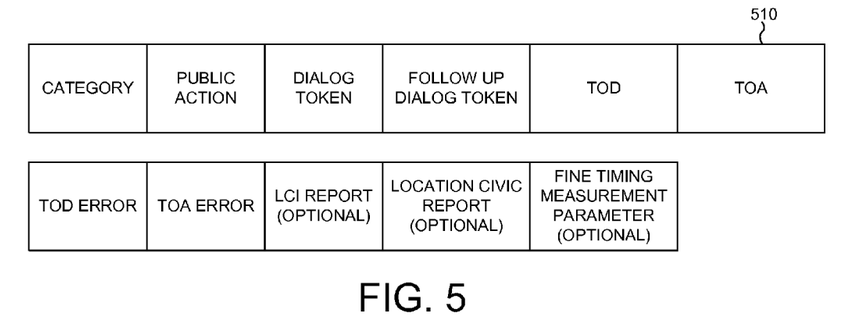
FIG. 5 is an example of a FTM frame with a list of co-located BSSIDs.

FIG. 5 is an example of a FTM action frame with a list of co-located BSSIDs. As depicted by FIG. 5, FTM action frame 510 comprises a 1-octet Category field, a 1-octet Public Action field, a 1-octet Dialog Token field, a 1-octet Follow Up Dialog Token field, a 6-octet TOD field, a 6-octet TOA field, a 2-octet TOD Error field, a 2-octet TOA Error field, an optional LCI Report field, an optional Location Civic Report field, and an optional FTM Parameter field. The category field is set to the value for Public. The Public Action filed is set to indicate a FTM frame. The Dialog Token field is a nonzero value chosen by the responding STA to identify the FTM frame as the first of a pair, with the second or follow-up FTM frame to be sent later. The Dialog Token field is set to "0" to indicate that the FTM frame will not be followed by a subsequent follow-up FTM frame. The Follow Up Dialog Token field is the nonzero value of the Dialog Token field of the last transmitted FTM frame to indicate that it is the follow up FTM frame and that the TOD, TOA, Max TOD Error and Max TOA Error fields contain the values of the timestamps captured with the first FTM frame of the pair. The Follow Up Dialog Token field is set to "0" to indicate that the FTM frame is not a follow up to a last transmitted FTM. The TOD, TOA, Max TOD Error, and Max TOA Error fields are expressed in units of 0.1 ns. The TOD field contains a timestamp that represents the time, with respect to a time base, at which the start of the preamble of the last transmitted FTM frame appeared at the transmit antenna connector. The TOA field contains a timestamp that represents the time, with respect to a time base, at which the start of the preamble of the ACK frame to the last transmitted FTM frame arrived at the receive antenna connector. The Max TOD Error field contains an upper bound for the error in the value specified in the TOD field. The Max TOA Error field contains an upper bound for the error in the value specified in the TOA field. The LCI Report field is optionally present. If present, it contains a Measurement Report element with Measurement Type equal to LCI report. The Location Civic Report field is optionally present. If present, it contains a Measurement Report element with Measurement Type equal to Location Civic report. The Fine Timing Measurement Parameter field is present in the initial Fine Timing Measurement Frame, and is not present in subsequent Fine Timing Measurement frames. If present, it contains a Fine Timing Measurement Parameter element. In one example, the list of co-located BSSIDs can be added in the FTM parameter element.

Figure 6:
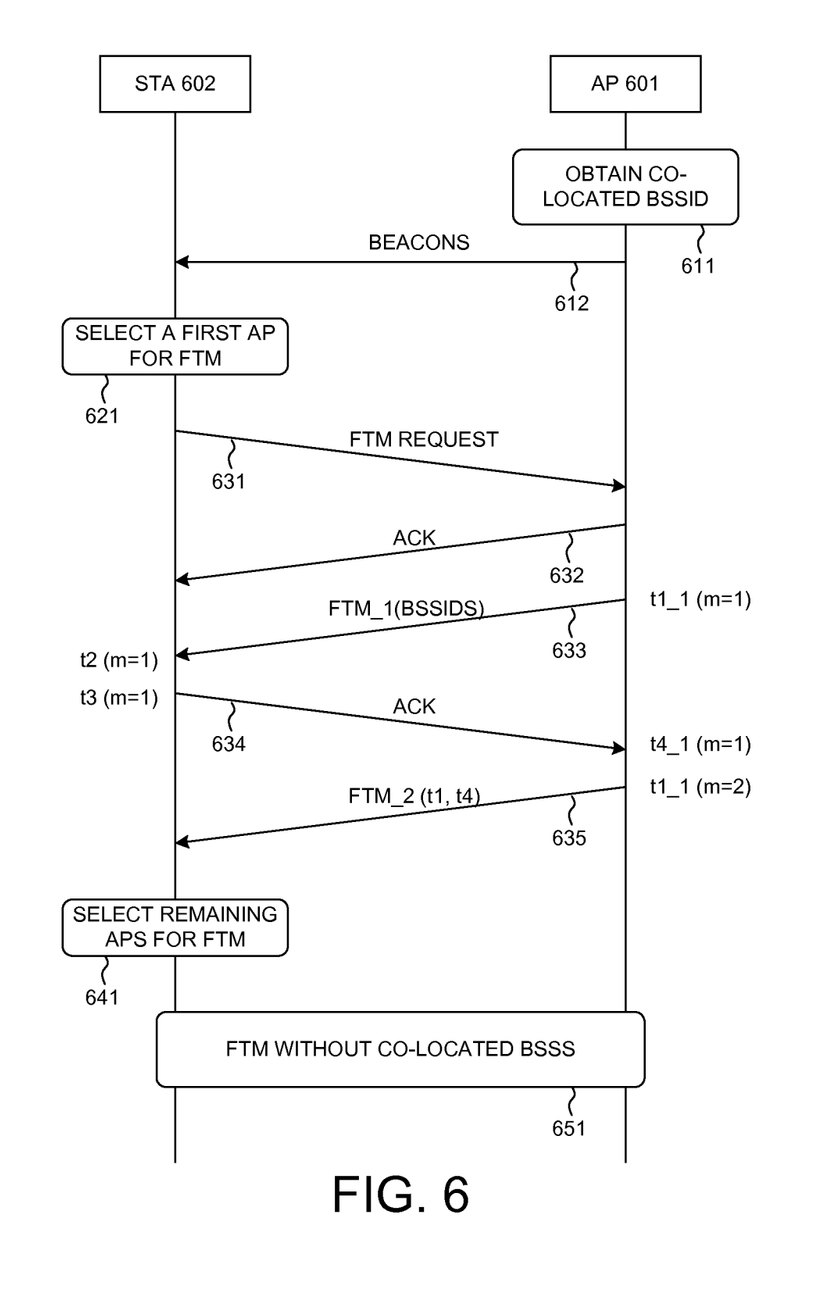
FIG. 6 illustrates one embodiment of sending co-located BSSIDs from an AP to STAs during FTM.

FIG. 6 illustrates one embodiment of sending co-located BSSIDs from an AP to STAs during FTM. In step 611, AP 601 determines a list co-located BSSIDs. In step 612, AP 601 broadcasts beacon frames to STAs in the configured BSS. The beacon frame may have one-bit indication, which indicates that this BSS is co-located with other BSSs. Such indication also indicates the capability of the AP to provide the list of the co-located BSSIDs. In step 621, STA 602 selects a first AP (e.g., AP 601) for performing FTM positioning procedure. STA 602 may have received beacons from multiple APs, some APs have the capability to provide co-located BSSID list, and some APs do not have such capability. As a result, STA 602 selects AP 601 and initiates FTM positioning procedure because the beacon from AP 601 indicates that AP 601 has the capability to provide co-located BSSID list.

In step 631, STA 602 sends an FTM request to AP 601. The FTM request contains one bit that is set by the STA to request for the list of co-located BSSIDs. In step 632, AP 601 sends an acknowledgement back to STA 602. In step 633, AP 601 sends a first FTM measurement frame (FTM_1) to STA 602 at time instance t1 (m=1), which denotes the first measurement session. STA 602 receives FTM_1 at time instance t2 (m=1). In step 634, STA 602 transmits an ACK frame to AP 601 at time instance t3 (m=1). AP 601 receives the ACK frame at time instance t4 (m=1). In step 635, AP 601 transmits a second FTM measurement frame FTM_2 at time instance t1 (m=2), which denotes the second measurement session. FTM_2 payload also includes the timestamps t1 and t4 of the first measurement session. Based on the FTM measurement results, STA 602 is able to compute the time-of-flight (TOF) or Round Trip Delay and its corresponding range/distance to AP 601.

In step 641, STA 602 selects additional APs for FTM positioning. For example, in 3D positioning, STA 602 selects three additional APs that are not co-located with AP 601. In step 651, STA 602 initiates FTM with the additional APs and computes its range/distance to each of the AP. In three-dimensional (3D) positioning, if STA 602 knows the absolute location of the APs, and its relative range/distance to each AP, then STA 602 will be able to determine its own location.

Figure 7:
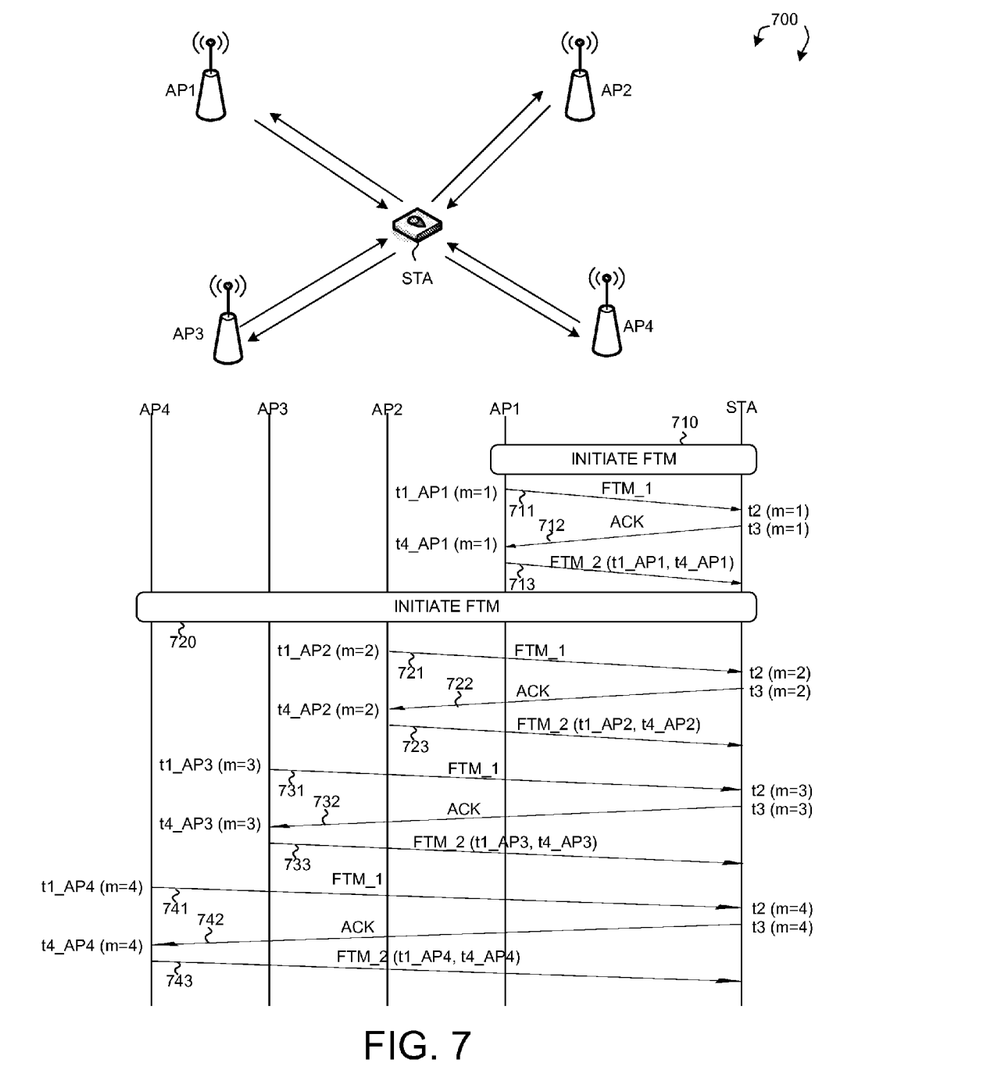
FIG. 7 illustrates a complete FTM positioning procedure using non-co-located BSSs.

FIG. 7 illustrates a complete FTM positioning procedure using non-co-located BSSs. Wireless local area network 700 is an indoor network and comprises four APs (AP1 to AP4) and a wireless non-AP station STA. In the example of FIG. 7, STA is an initiating device that initiates an FTM positioning procedure, while the APs are responding devices that respond to the FTM positioning procedure. In step 710, the STA initiates an FTM procedure with a first AP (AP1). In one example, the STA selects AP1 because a beacon frame broadcasted from AP1 indicates that AP1 has the capability of providing co-located BSSIDs. As a result, the STA sends a FTM requests explicitly asking for a list of co-located BSSIDs of AP1, and in response receives an ACK from AP1.

In step 711, AP1 transmits a first FTM measurement frame FTM_1 at time instance t1_AP1 (m=1), which denotes the first measurement session. FTM_1 includes AP location information and the list of co-located BSSIDs of AP1 in response to the FTM request. STA receives FTM_1 at time t2_AP1 (m=1). In step 712, STA transmits an ACK frame to AP1 at time instance t3_AP1 (m=1). AP1 receives the ACK frame at time instance t4_AP1 (m=1). In step 713, AP1 transmits a second FTM measurement frame FTM_2. The FTM_2 payload also includes the timestamps t1_AP1 and t4_AP1 of the first measurement session.

In step 720, the STA initiates an FTM procedure with three additional APs (AP2, AP3, and AP4). Based on the received BSSID list, the STA can makes sure that no APs are co-located with each other. The STA sends FTM request to each AP and receives ACK from each AP. Note that this time the STA no longer needs to request for AP location and co-located BSSID list because the STA already knows which BSSIDs are co-located or not. In addition, the STA can use parallel operation, e.g., initiate FTM with non-co-located BSSs at the same time if desired.

In step 721, AP2 transmits a first FTM measurement frame FTM_1 at time instance t1_AP2 (m=2), which denotes the second measurement session. STA receives FTM_1 at time instance t2_AP2 (m=2). In step 722, STA transmits an ACK frame to AP2 at time instance t3_AP2 (m=2). AP2 receives the ACK frame at time instance t4_AP2 (m=2). In step 723, AP2 transmits a second FTM measurement frame FTM_2. The FTM_2 payload also includes the timestamps t1_AP2 and t4_AP2 of the first measurement session.

In step 731, AP3 transmits a first FTM measurement frame FTM_1 at time instance t1_AP3 (m=3), which denotes the third measurement session. STA receives FTM_1 at time instance t2_AP3 (m=3). In step 732, STA transmits an ACK frame to AP3 at time instance t3_AP3 (m=3). AP3 receives the ACK frame at time instance t4_AP3 (m=3). In step 733, AP3 transmits a second FTM measurement frame FTM_2. The FTM_2 payload also includes the timestamps t1_AP3 and t4_AP3 of the first measurement session.

In step 741, AP4 transmits a first FTM measurement frame FTM_1 at time instance t1_AP4 (m=4), which denotes the fourth measurement session. STA receives FTM_1 at time instance t2_AP4 (m=4). In step 742, STA transmits an ACK frame to AP4 at time instance t3_AP4 (m=4). AP4 receives the ACK frame at time instance t4_AP4 (m=4). In step 743, AP4 transmits a second FTM measurement frame FTM_2. The FTM_2 payload also includes the timestamps t1_AP4 and t4_AP4 of the first measurement session.

Based on the FTM measurement results, STA computes the time-of-flight (TOF) or Round Trip Delay (RTD/2) and its corresponding range/distance AP1, AP2, AP3, and AP4. For example:

$$TOF\_AP1 = [(t4\_AP1 - t1\_AP1) - (t3\_AP1 - t2\_AP1)]/2 \quad (m=1)$$

$$TOF\_AP2 = [(t4\_AP2 - t1\_AP2) - (t3\_AP2 - t2\_AP2)]/2 \quad (m=2)$$

$$TOF\_AP3 = [(t4\_AP3 - t1\_AP3) - (t3\_AP3 - t2\_AP3)]/2 \quad (m=3)$$

$$TOF\_AP4 = [(t4\_AP4 - t1\_AP4) - (t3\_AP4 - t2\_AP4)]/2 \quad (m=4)$$

and

Distance to $AP1 = C * TOF\_AP1$

Distance to $AP2 = C * TOF\_AP2$

Distance to $AP3 = C * TOF\_AP3$

Distance to $AP4 = C * TOF\_AP4$ where

C is the speed of radio signal.

In three-dimensional (3D) positioning, if the STA knows the absolute location of the APs, and its relative range/distance to each AP, then the STA is able to determine its own location.

Figure 8:
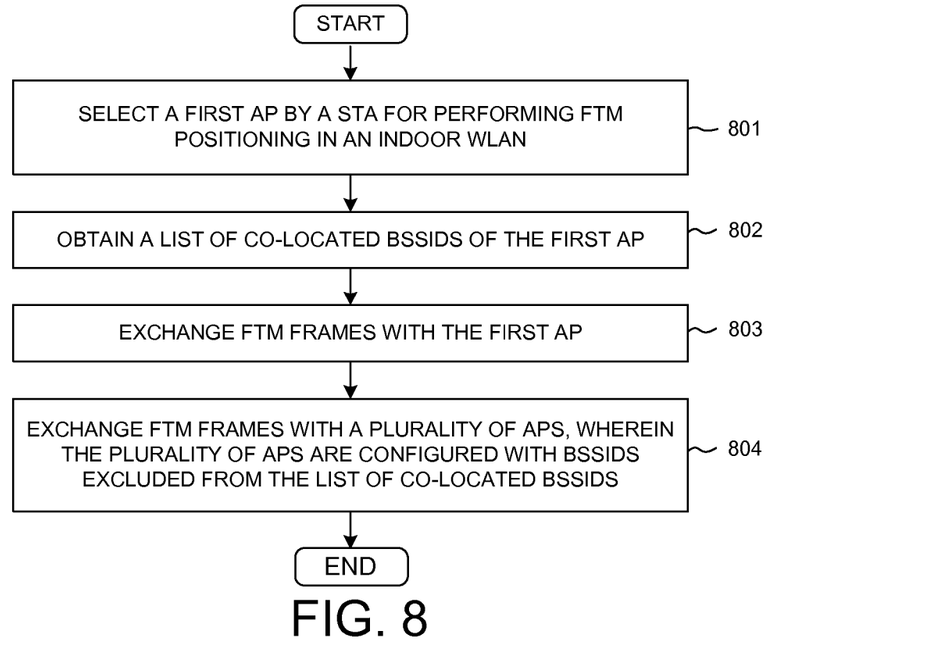
FIG. 8 is a flow chart of a method of avoiding FTM with co-located BSSs from AP perspective in accordance with one novel aspect.

FIG. 8 is a flow chart of a method of avoiding FTM with co-located BSSs from AP perspective in accordance with one novel aspect. In step 801, a station selects a first access point (AP) for performing fine timing measurement (FTM) positioning in an indoor wireless local area network. In step 802, the station obtains a list of co-located basic service set IDs (BSSIDs) of the first AP. In step 803, the station exchanges FTM frames with the first AP. In step 804, the station exchanges FTM frames with a plurality of APs that are configured with BSSIDs excluded from the list of co-located BSSIDs. In one embodiment, the station obtains the list of co-located BSSIDs of the first AP via Access Network Query Protocol (ANQP). In another embodiment, the station obtains the list of co-located BSSIDs via the FTM frame exchange with the first AP. For example, the station explicitly requests for the list of co-located BSSIDs in an FTM request frame when initiating the FTM positioning.

Figure 9:
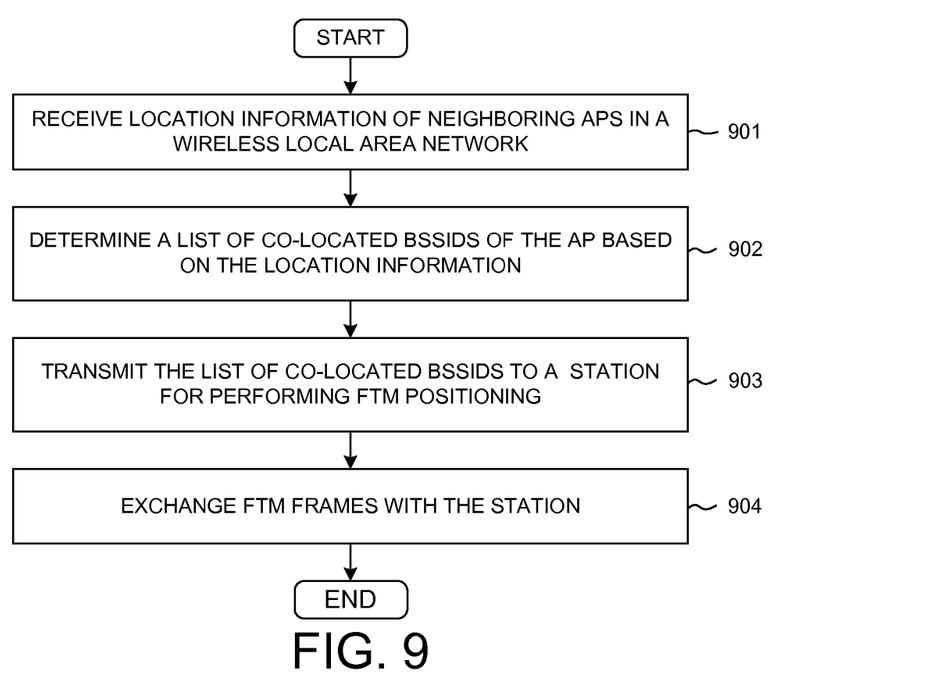
FIG. 9 is a flow chart of a method of avoiding FTM with co-located BSSs from STA perspective in accordance with one novel aspect.

FIG. 9 is a flow chart of a method of avoiding FTM with co-located BSSs from STA perspective in accordance with one novel aspect. In step 901, an access point (AP) receives location information of neighboring APs in a wireless local area network. In step 902, the AP determines a list of co-located basic service set IDs (BSSIDs) of the AP based on the location information. In step 903, the AP transmits the list of co-located BSSIDs to a station for performing fine timing measurement (FTM) positioning. In step 904, the AP exchanges FTM frames with the station. The AP receives neighboring APs location by exchanging Neighbor Report (NR) elements, or by querying each other for location using ANQP, or by requesting an FTM action frame with location from the other APs. Two BSSs are co-located under FTM purpose if they are configured on the same physical device, are configured with the same location as neighboring BSSs, or are geographically close to each other substantially.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   selecting a first access point (AP) by a station for performing fine timing measurement (FTM) positioning in an indoor wireless local area network;
   obtaining a list of co-located Basic Service Set IDs (BSSIDs) of the first AP;
   exchanging FTM frames by the station with the first AP; and
   exchanging FTM frames by the station with a plurality of APs, wherein the plurality of APs are configured with BSSIDs excluded from the list of co-located BSSIDs of the first AP such that each of the plurality of APs and the first AP are not co-located with each other, wherein the list of co-located BSSIDs of the first AP refers to co-located APs that are geographically close to the first AP substantially.

2. The method of claim 1, wherein a first BSS is co-located with a second BSS when the first BSS and the second BSS are configured on the same physical device, are configured with the same location as neighboring BSSs, or are geographically close to each other substantially.

3. The method of claim 1, wherein the station selects the first AP based on a beacon frame broadcasted by the first AP, and wherein the beacon frame indicates capability of providing the list of co-located BSSIDs.

4. The method of claim 1, wherein the station obtains the list of co-located BSSIDs of the first AP via Access Network Query Protocol (ANQP).

5. The method of claim 1, wherein the station obtains the list of co-located BSSIDs via the FTM frame exchange with the first AP.

6. The method of claim 5, wherein the station sends an FTM request frame comprising an explicit request for the list of co-located BSSIDs.

7. The method of claim 5, wherein the station receives an FTM response frame comprising the list of co-located BSSIDs.

8. A wireless station, comprising:
   a control and configuration module that selects a first access point (AP) for performing fine timing measurement (FTM) positioning in an indoor wireless local area network;
   a receiver that receives a list of co-located Basic Service Set IDs (BSSIDs) of the first AP; and
   an FTM module that exchanges FTM frames with the first AP, wherein the FTM module also exchanges FTM frames with a plurality of APs, and wherein the plurality of APs are configured with BSSIDs excluded from the list of co-located BSSIDs of the first AP such that each of the plurality of APs and the first AP are not co-located with each other, wherein the list of co-located BSSIDs of the first AP refers to co-located APs that are geographically close to the first AP substantially.

9. The station of claim 8, wherein a first BSS is co-located with a second BSS when the first BSS and the second BSS are configured on the same physical device, are configured with the same location as a neighboring BSS, or are geographically close to each other substantially.

10. The station of claim 8, wherein the station selects the first AP based on a beacon frame broadcasted by the first AP, and wherein the beacon frame indicates capability of providing the list of co-located BSSIDs.

11. The station of claim 8, wherein the station obtains the list of co-located BSSIDs of the first AP via Access Network Query Protocol (ANQP).

12. The station of claim 8, wherein the station obtains the list of co-located BSSIDs via the FTM frame exchange with the first AP.

13. The station of claim 12, wherein the station sends an FTM request frame comprising an explicit request for the list of co-located BSSIDs.

14. The station of claim 12, wherein the station receives an FTM response frame comprising the list of co-located BSSIDs.

15. A method comprising:
   receiving, by an access point (AP), location information of neighboring APs in a wireless local area network;
   determining a list of co-located Basic Service Set IDs (BSSIDs) of the AP based on the location information, wherein the list of co-located BSSIDs of the AP indicates that corresponding neighbor APs and the first AP are not co-located with each other;
   transmitting the list of co-located BSSIDs of the AP to a non-AP station for performing fine timing measurement (FTM) positioning, wherein the list of co-located BSSIDs of the AP refers to the corresponding neighbor APs that are geographically close to the AP substantially; and
   exchanging FTM frames with the station.

16. The method of claim 15, wherein a first BSS is co-located with a second BSS when the first BSS and the second BSS are configured on the same physical device, are configured with the same location as neighboring BSSs, or are geographically close to each other substantially.

17. The method of claim 15, wherein the AP broadcasts a beacon frame that indicates capability of providing the list of co-located BSSIDs.

18. The method of claim 15, wherein the AP sends the list of co-located BSSIDs via Access Network Query Protocol (ANQP).

19. The method of claim 15, wherein the AP sends the list of co-located BSSIDs via the FTM frame exchange with the station, wherein the AP receives an FTM request frame comprising an explicit request for the list of co-located BSSIDs.

20. The method of claim 15, wherein the AP receives location information of the neighboring APs by exchanging Neighbor Report (NR) elements, by querying for location using access network query protocol (ANQP), or by requesting an FTM action frame with location from the neighboring APs.

* * * * *

UNITED STATES PATENT AND TRADEMARK OFFICE
CERTIFICATE OF CORRECTION

PATENT NO. : 9,769,626 B2
APPLICATION NO. : 14/739115
DATED : September 19, 2017
INVENTOR(S) : Gabor Bajko et al.

It is certified that error appears in the above-identified patent and that said Letters Patent is hereby corrected as shown below:

On the Title Page

Left column, (72) Inventors: "Chih-Shi Yee, Hsinchu (TW)." is missing.

In the Claims

Column 10, Line 33, Claim 15 the word "first" should be removed.

Column 10, Line 34, Claim 15 the word "not" should be removed.

Signed and Sealed this
Twenty-eighth Day of November, 2017

Joseph Matal
*Performing the Functions and Duties of the*
*Under Secretary of Commerce for Intellectual Property and*
*Director of the United States Patent and Trademark Office*